United States Patent

[11] 3,598,419

| [72] | Inventors | Kenneth J. Nisper<br>Spring Lake;<br>Robert Lakanen, Muskegon, both of, Mich. |
|---|---|---|
| [21] | Appl. No. | 843,592 |
| [22] | Filed | July 22, 1969 |
| [45] | Patented | Aug. 10, 1971 |
| [73] | Assignee | Muskegon Piston Ring Company<br>Muskegon, Mich. |

[54] RING LATCHES
11 Claims, 12 Drawing Figs.

[52] U.S. Cl................................................. 277/219,
24/23, 29/453, 29/525
[51] Int. Cl........................................... F16j 9/12
[50] Field of Search........................................... 29/453,
525, 404; 24/23, 22, 265 RL, 268; 277/140, 218, 219

[56] References Cited
UNITED STATES PATENTS
3,472,521   10/1969   Nisper et al.................. 277/140
FOREIGN PATENTS
22,979   10/1906   Great Britain................ 277/218

*Primary Examiner*—Robert I. Smith
*Attorney*—Price, Heneveld, Huizenga & Cooper ABSTRACT: A latching device for accurately abutting parted ends of a piston ring by engaging the expander-spacer of the ring, the device comprising a flexible molded or stamped body dimensioned so as to fit between the sides of the expander-spacer adjacent the part, the body having two pairs of ears projecting outwardly so as to engage said adjacent sides of said ring in their openings, but not so far as to extend out beyond the faces of the sides of the expander-spacer.

RING LATCHES

BACKGROUND OF THE INVENTION

Piston rings, when they are installed in the grooves of a piston, must be positively aligned when they come into abutment Otherwise, the ends of the ring at the part may become misaligned or cocked, or even overlapped. Such improper abutment of the ends of the piston ring is serious because it can cause distortion of the ring, loss of radial tension and binding between the ring and the sides of the ring groove, resulting in damage to the cylinder bore. It can also cause misalignment of any rails which are used with the ring so as to effect the amount of radial tension applied to the rail. The amount of radial tension is precisely predetermined for each ring and failure to provide the prescribed radial tension value can seriously impair the ring's effectiveness. Both too much and too little radial tension impairs the sealing characteristics of the ring. Cocked rings frequently bind or jam in the ring grooves restricting the ring's freedom of radial movement. This produces a leaky ring, ineffective for its primary purpose.

In our copending patent application Ser. No. 698,372, filed on Dec. 28, 1967, we disclosed a latch which provides a positive abutment of the type which overcomes the previous problems. The present invention was conceived to provide a latch which is considerably smaller in size, simpler in construction, and which operates in a different fashion.

SUMMARY OF THE INVENTION

The invention relates to a latch for a parted piston ring having a major portion of its cross section void and in cross section shaped to form a circumferential channel defined by radially extending webs, the channel being accessible from one radial face of the ring. Specifically, we have provided means for guiding the ends of the ring together when the part therein is closed, the means comprising a body and means on the body for engaging each of the webs immediately adjacent to and on opposite sides of the part.

Accordingly, it is an object of the invention to provide accurate abutment of parted piston rings when they are installed by a device which is inexpensive to produce.

It is another object of the invention to provide a device of the above character which is easy to utilize in so aligning the ends of the piston ring.

It is a related object of the invention to provide a device of the above character which when installed still allows the expander-spacer to undergo normal flexing.

Other objects and advantages will become apparent upon reference to the following drawings and detailed discussion.

BRIEF DESCRIPTION OF THE DRAWINGS

FIG. 3 is a perspective view of one embodiment of the latching device constituting the invention;

FIG. 6 is a perspective view of an alternate embodiment of the latching device comprising the invention;

FIG. 7 is a sectional view taken along the line VII–VII of FIG. 6;

FIG. 8 is a perspective view illustrating still another alternate embodiment;

DESCRIPTION OF THE PREFERRED EMBODIMENTS

Figure 1:
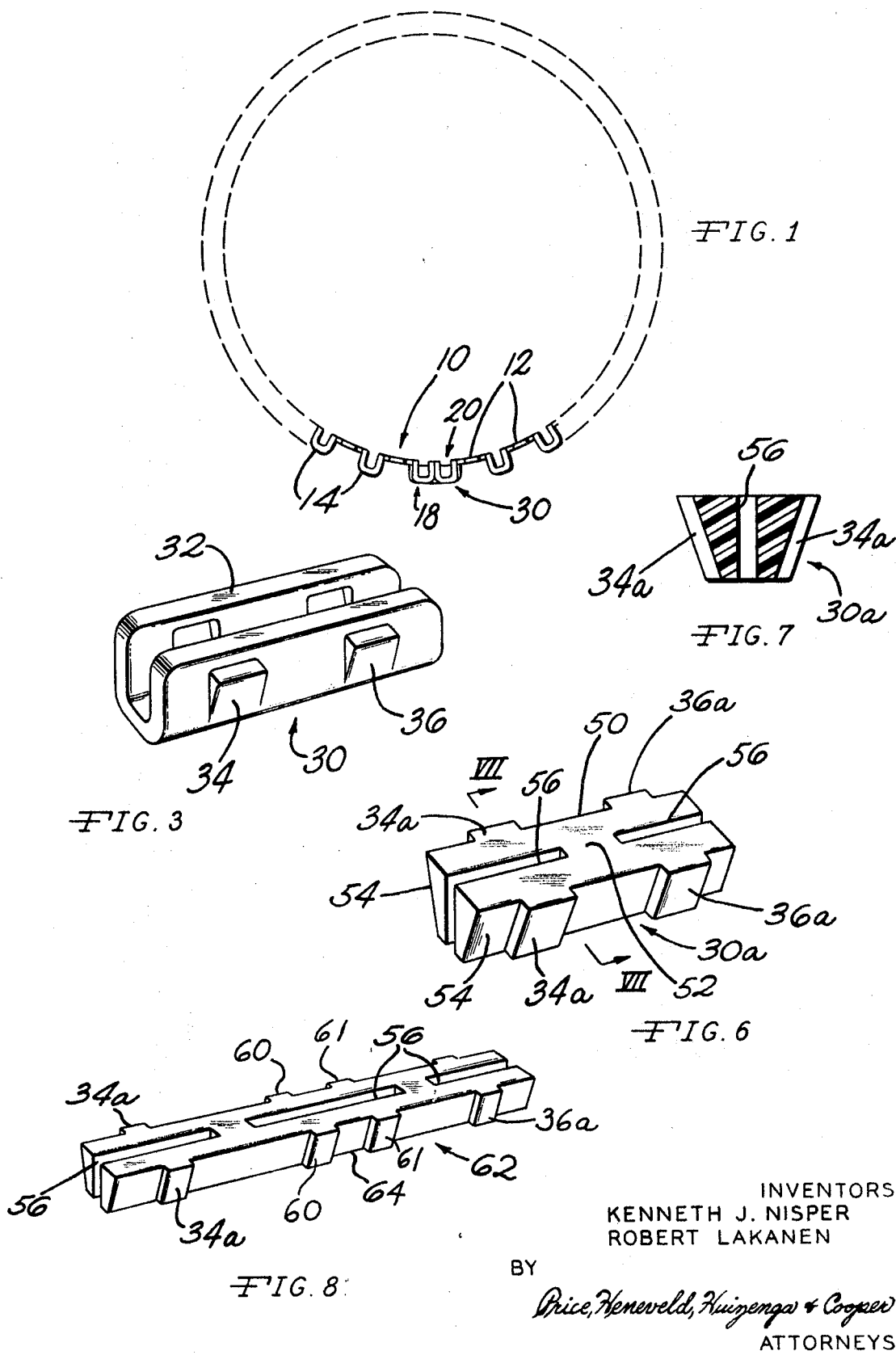
FIG. 1 is a plan view of an expander-spacer of a parted piston ring accurately assembled with its ends in proper abutment as obtained by the invention.
Figure 2:
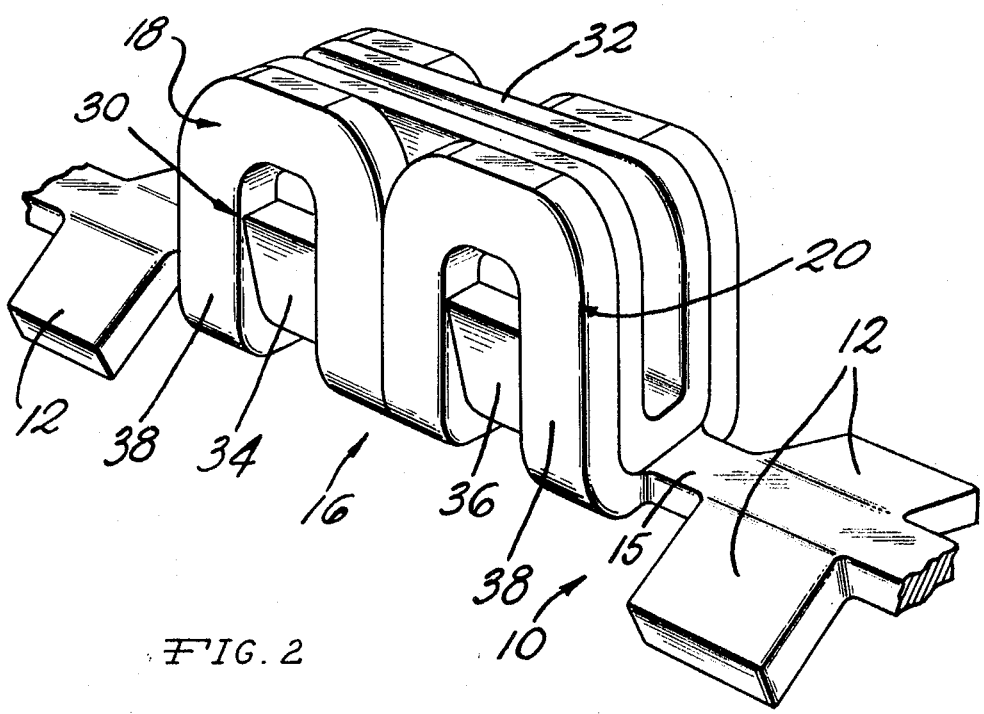
FIG. 2 is a fragmentary perspective view of the joined parted ends of the piston ring shown in FIG. 1.

This invention relates to a latch which serves as an accessory for parted piston rings generally comprising an expander-spacer 10 and one or more rails (not shown) seated on the rail seats of the expander-spacer and bearing against the vertically extending rail stops or ears 12. The expander-spacer conventionally comprises a series of paired, looplike rail seats 14 radially extending from opposite sides of the circumferentially extending connecting webs 15, the paired rail seats forming a circumferential channel which in the particular construction illustrated opens, as shown in FIGS. 1 and 2, radially outwardly. In the case of a ring using either no rails or only one rail, the sides of the spacer-expander may not form rail seats. However, for purposes of this invention, whether or not rails are used is immaterial. The expander-spacer is parted at 16, so that the two pairs of rail seats 18 and 20 are immediately adjacent to and on opposite sides of the part 16.

Figure 4:
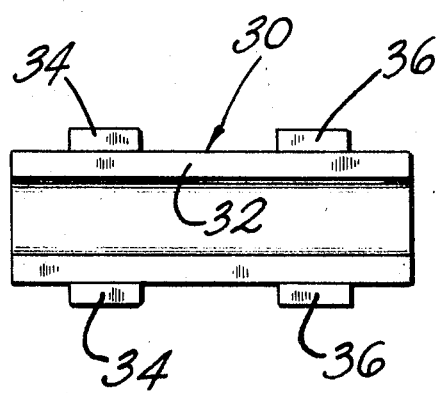
FIG. 4 is a plan view of the device illustrated in FIG. 3.
Figure 5:
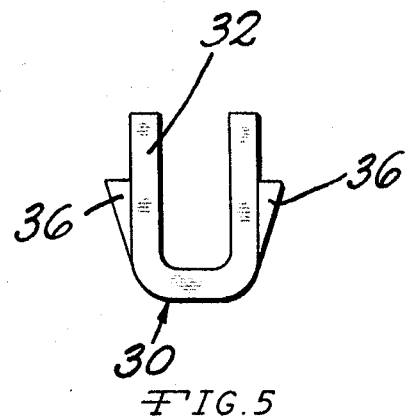
FIG. 5 is an end elevational view of the latching device disclosed in FIG. 4.

In accordance with the invention, a latch 30 is utilized to bring the rail seats 18 and 20 into proper abutted alignment. The latch comprises a body 32 which, as shown in FIGS. 3–5, is a U-shaped channel. To hold the paired webs 18 and 20 in properly abutted alignment, two pairs of inclined ears 34 and 36 are provided. One end 20, each ear is attached to the body with the opposite end projecting outwardly from the body 32 a sufficient distance so that, when the latch is placed within the channel defined by the paired rail seats 18 and 20, the ears project into the openings formed within the rail seats 18 and 20, but do not project beyond the rail seat or side surface 38 of the rail seats.

Because the body 32 is flexible, the latch 30 is easily installed in one end of the expander-spacer, say the end defined by the paired rail seats 18, merely by flexing the body so as to pass it between the rail seats and snap the ears 34 into the openings in the rail seats. The piston ring, with rails, if required, and without rails, if none are required, is then installed around the piston within the piston groove merely by slipping the ring over the piston. When in place in the groove, the installer merely connects the paired rail seats 20 to the paired rail seats 18 by snapping the ears 36 into place within the rail seats 20 with the body 32 also confined by that pair of rails. At this point, the latching device has completed its function, the ring being properly seated in its groove. Thereafter, the latching device may be allowed to disintegrate as the piston operates, but only as described below.

The latching device 30 can be made from synthetic material such as Lexan, Zytel 103, Fluorel, or Nylon 12. In all cases, the material is molded to have the shape depicted and described above. Other synthetic materials may be usable, provided either that they withstand the operating temperatures of the piston or upon failure, they vaporize or otherwise disintegrate without leaving a residue which could clog the openings in the ring or interfere with its freedom of movement. It will be recognized that in situations requiring operating temperatures above that permissible with synthetic materials, the latch can be fabricated from metal such as beryllium copper stamped from a sheet to have the desired form, the ears in that case being punched out from the sides of the channel.

FIGS. 6 through 8 illustrate an alternate embodiment of the latching device described above, wherein the body of the device has a different form. Parts similar to those previously described bear the same reference numeral to which the distinguishing suffix *a* has been added. Thus, the latching device 30a comprises a wedge-shaped body 50, having a center section 52, the outer surfaces 54 being molded or otherwise formed to give the wedge shape. To provide a significant part of the body's cross section with a void so as to reduce the weight and to provide flexibility to the body 50, a groove 56 is formed therein extending from both ends of the body 50 to a point adjacent to the center section 52. To engage the ring seats of the expander-spacer, paired ears 34a and 36a are formed integral with the body extending out beyond the surface 54 only a sufficient distance to engage in rail seats. Again the ears must not project beyond the side faces of the rail seats. Because of the flexibility to the latching device 30a provided by the grooves 56, it will be apparent that the latching device 30a is utilized in exactly the same manner as the previous embodiment described above. Also, the latching device 30a can be made from the same synthetic materials as the latching device 30 described above.

FIG. 8 illustrates still another embodiment of the latching device, in this case an enlarged version of the embodiment shown in FIG. 6. Thus, two additional pairs of ears 60 and 61 have been added to an elongated body 62, so that two pairs of ears engage two rail seats 14 on each side of the part 16 forming the gap. This larger version is utilized in those cases where the small size of the previously described embodiments make them difficult to handle.

It should be noted that FIG. 8 also illustrates a method of manufacturing the latching devices and comprises essentially molding, as an integral piece body 62, and thereafter applying a cut such as at point 64 to separate the bar into individual latching devices. It will be readily apparent to one skilled that the same manufacturing techniques can be utilized in the latching device disclosed in the previous embodiment wherein the body 32 is U-shaped. In the case of the U-shaped body made from metal, it could be manufactured as a strip by continuous methods such as rolling.

Figure 9:
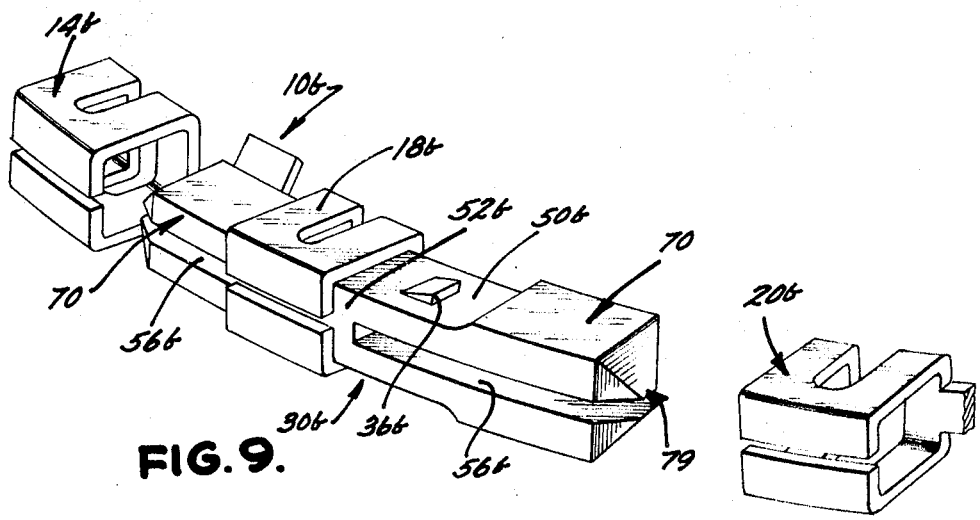
FIG. 9 is a fragmentary perspective view of yet another embodiment of the latching device in the process of being utilized to latch the ring.
Figure 10:
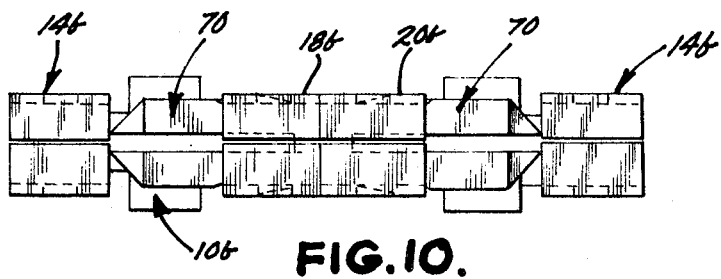
FIG. 10 is a fragmentary plan view of the embodiment illustrated in FIG. 9 with the expander-spacer completely latched thereby.
Figure 11:
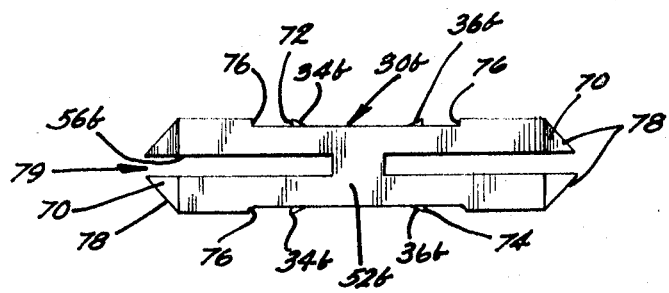
FIG. 11 is a plan view of the latching device of FIGS. 9 and 10, the latching device being shown without the expander-spacer.
Figure 12:
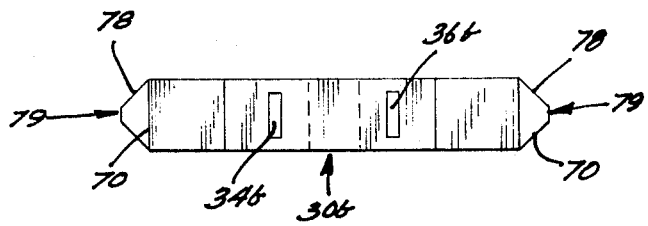
FIG. 12 is an elevational view of the device shown in FIG. 11.

FIGS. 9 through 12 illustrate yet another embodiment of the invention, wherein the rail seats of the expander-spacer ring are shaped differently from those of the previous embodiments. Parts similar to those previously described bear the same reference numeral to which the distinguishing suffix b has been added. Thus, the rail seats 14b are not open radially outwardly but are bent over the top, necessitating that the latch be entered from the gap side of the expander-spacer ring 10b, as has already been done for one end of the ring in FIG. 9. The latching device 30b comprises a body 50b which has a groove 56b extending from the center portion 52b of the body so as to provide the flexibility as in the case of the embodiment of FIG. 6. To snap the latching device 30b into position as shown in FIG. 9, each of the two ends of the body are enlarged at 70 so that after the body is compressed so as to slip through the rail seat 18b, the latching device cannot be pulled out of the rail seat 18b. The other end 70 functions in the same manner when the rail seat 20b is forced over that end 70 so as to complete the latching of the expander-spacer ring. To further hold the latching device 30b in the correct position relative to the rail seats 18b and 20b, two pairs of ears 34b and 36b are provided on the sides of the body 50b, the ears projecting out sufficiently forward so as to engage the openings in the rail seats 18b and 20b, respectively. However, the ears 34b and 36b do not project beyond the openings in the rail seat. It will be readily apparent that the flat surface 72 of the ears 34b serves to preclude the latching device from sliding too far into the expander-spacer device, and specifically too far into the rail seat 18b such as when the gap of the ring is closed by pressing rail seat 20b over the end 70. The ears 36b have a similar flat surface 74 which functions to engage the opening of the rail seat 20b. Thus, because the end 70 on the latching device terminates also at a flat surface 76, there is a positive locking of the latching device within the expander-spacer ring, the rail seats 18b and 20b being locked between the flat surfaces 72 and 76, and 74 and 76, respectively.

To facilitate the sliding of the ends 70 into the rail seats 18b and 20b, the latching device being slid in through the opening 77 of the gap forming the part, the ends 70 have a tapered surface 78 forming a point 79.

While several embodiments of this invention have been described, it will be recognized that other embodiments may be made within the teaching of this invention. For example, the latching devices so disclosed can be used on any expander-spacer having a radially opening channel and openings suitable to engage the ears 34 and 36. For example, the latching device disclosed herein can be readily utilized with an expander-spacer which opens radially inward rather than outward. Also, the use of rails with the expander-spacer is optional insofar as the invention is concerned.

The embodiments of the invention in which we claim an exclusive property or privilege are defined as follows:

1. A one-piece latch for holding in closed position the ends of a parted piston ring, the ring, in its relaxed condition having a gap between its ends at the part; the ring having axially extending sides forming a circumferential channel opening through one radial face of said ring, said ring adjacent each of its ends having a pair of openings one in each of said sides of said channel, said latch comprising an elongated body adapted to seat within said channel with its midpoint substantially at said part; a pair of wings adjacent each of the ends of said body, one on each side thereof, one wing of each pair on each side of said body and adapted to seat in each of said openings; the sides of said body at said wings being flexible to permit said sides to be forced toward each other sufficiently to pass said wings into said channel during installation; cooperating planer surfaces of the latch and ring sides for holding the ends of the ring in axial alignment and cooperating surfaces on said wings and openings and the distance between the pair of wings lengthwise of the latch being such as will hold the ends of the ring closed when the ring is seated in a ring groove.

2. A one-piece latch for closing together in aligned relationship the ends of a parted piston ring, the ring, in its relaxed condition having a gap between its ends at the part, the ring having an expander-spacer with radially extending axially spaced sides forming a circumferential channel, said expander-spacer adjacent each of its ends having a pair of openings one in each of said sides of said channel, said latch comprising: an elongated body, said body on each side of its longitudinal midpoint having a pair of oppositely extending ears, one receivable in each of said openings in said sides; said latch body in the portion thereof having said ears being resiliently compressible to permit said ears to be introduced into said channel; cooperating planer surfaces on the latch and spacer-expander sides for holding the ends of the ring in axial alignment and cooperating surfaces on said ears and openings and the distance between the pairs of ears lengthwise of the latch being such as will hold the ends of the ring closed when the ring is seated in a ring groove.

3. The latch as defined in claim 2, wherein said body has a significant portion of its cross section void and said ears are prevented from projecting axially beyond the faces of said sides of said ring.

4. The latch as defined in claim 3 wherein said body is a U-shaped channel.

5. The latch as defined in claim 3 wherein said body is wedge-shaped with a groove running from the center of said body to both of its ends.

6. The latch as defined in claim 2 wherein said body includes means for sliding said body into said sides from the opening in the sides forming the gap of said part.

7. The latch as defined in claim 6 wherein said sliding means includes tapered surfaces at both ends of said body, said tapered surfaces forming a point.

8. A one-piece latch for closing together in aligned relationship the ends of a parted piston ring, the ring, in its relaxed condition having a gap between its ends at the part, the ring having an expanded-spacer with radially extending axially spaced sides forming a circumferential channel accessible from one radial face of said ring, said expander-spacer adjacent each of its ends having a pair of openings one in each of said sides of said channel, said latch comprising: an elongated body seated in said channel, said body on each side of its longitudinal midpoint having a pair of oppositely extending ears one received in each of said openings in said sides; said latch body in the portion thereof having said ears being resiliently compressible to permit said ears to be introduced into said channel; cooperating planer surfaces on the latch and spacer-expander sides holding the ends of the ring in axial alignment and cooperating surfaces on said ears and openings and the distance between the pairs of ears lengthwise of the latch being such that the ends of the ring are held closed when the ring is seated in a ring groove.

9. The piston ring as defined in claim 8 wherein said body has a significant portion of its cross section void and said ears are prevented from projecting axially beyond the faces of said sides of said ring.

10. The piston ring as defined in claim 8 wherein said body is a U-shaped channel.

11. The piston ring as defined in claim 9 wherein said body is wedge-shaped with a groove running from the center of said body to both of its ends.

PO-1050
(5/69)

UNITED STATES PATENT OFFICE
CERTIFICATE OF CORRECTION

Patent No. 3,598,419          Dated  August 10, 1971

Inventor(s) Kenneth J. Nisper and Robert Lakanen

It is certified that error appears in the above-identified patent and that said Letters Patent are hereby corrected as shown below:

Column 2, line 30:

"20" should be --- of ---.

Signed and sealed this 14th day of March 1972.

(SEAL)
Attest:

EDWARD M. FLETCHER, JR.         ROBERT GOTTSCHALK
Attesting Officer               Commissioner of Patents